April 26, 1966    J. C. HINTERMAIER    3,247,596
INDICATING CALIPER WITH CONSTANT FORCE RETURN SPRING
Filed April 25, 1963    3 Sheets-Sheet 2
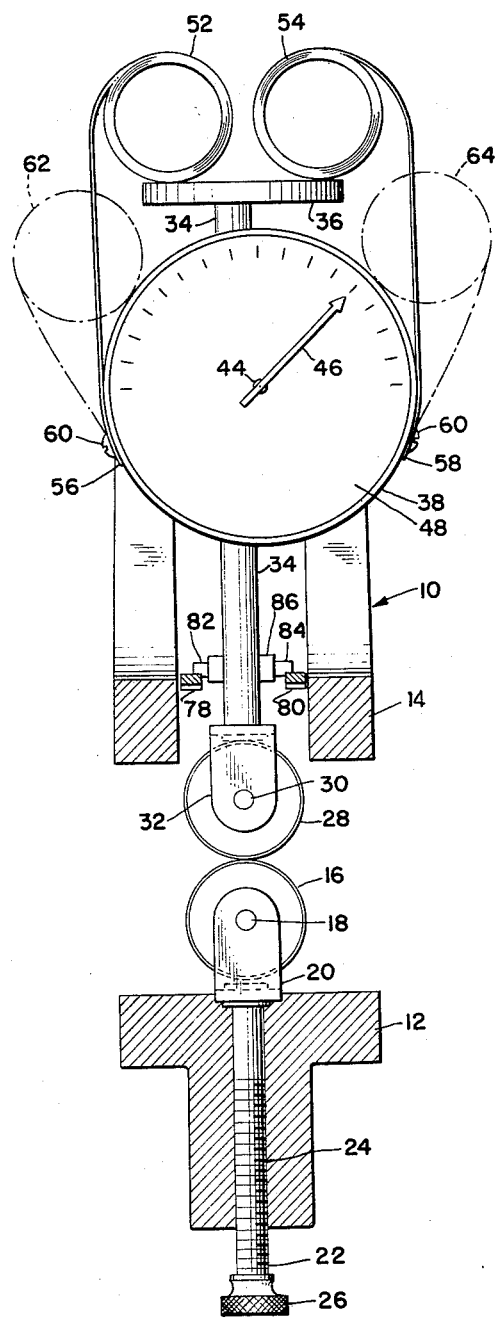
FIG. 2
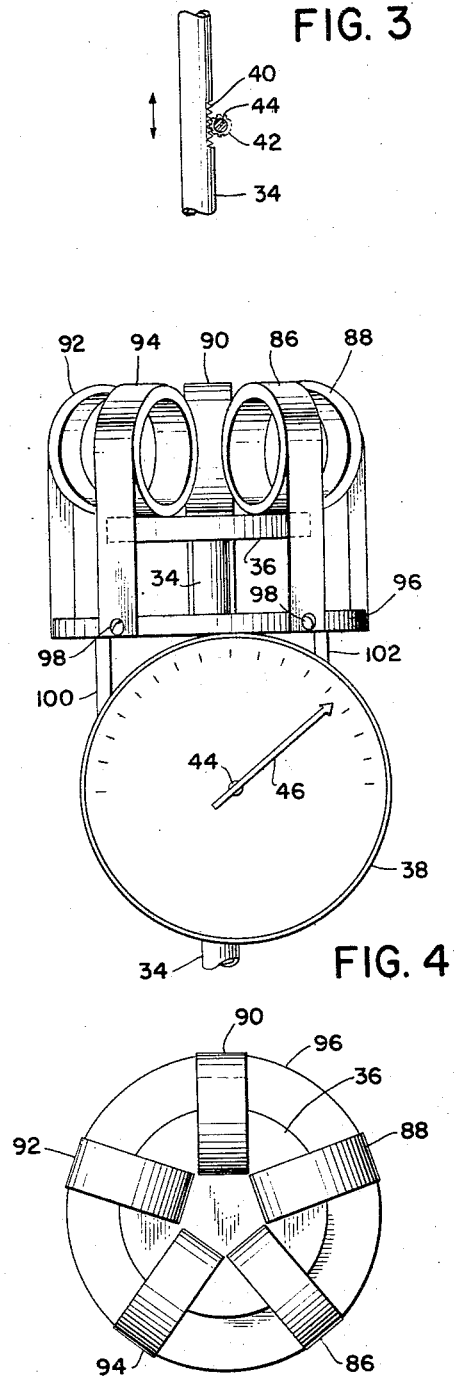
FIG. 3
FIG. 4
FIG. 5

April 26, 1966     J. C. HINTERMAIER     3,247,596
INDICATING CALIPER WITH CONSTANT FORCE RETURN SPRING
Filed April 25, 1963     3 Sheets-Sheet 3

United States Patent Office 3,247,596
Patented Apr. 26, 1966

3,247,596
INDICATING CALIPER WITH CONSTANT FORCE RETURN SPRING
John C. Hintermaier, Troy, N.Y., assignor to Huyck Corporation, Stamford, Conn., a corporation of New York
Filed Apr. 25, 1963, Ser. No. 275,637
1 Claim. (Cl. 33—147)

This invention relates to a thickness gauge and more particularly relates to apparatus for measuring the thickness and compressibility of belts, bands, and the like, of compressible materials while they are in motion.

The measurement of the thickness of relatively readily compressible or deformable materials, such as textile fabrics, other fibrous assemblies in the form of mats or batts or sheets made from synthetic rubber or foam, requires that an accurately known compressive force be applied directly to the material regardless of the material movement, speed or angle of travel. For example, the measurement of the thickness of a running felt on a papermaking machine requires that an accurately known compressive force of a particular magnitude be applied directly to the felt regardless of felt speed or angle of travel. Papermaking roll arrangements require felts to travel through paths at various angles from horizontal to vertical. Thus, felt paths at points convenient for measuring may vary between horizontal and vertical. Presently known thickness measuring devices rely upon movable weights or springs to apply the necessary forces. Measuring devices using movable weights depend on gravity and require a substantially horizontal felt path for accurate measurement. Overcoming such natural limitations requires a device of complicated construction which would be excessively heavy for holding in the hand of the operator. A device in which the compressive force is applied by a weight or a series of weights seriously restricts the scope of measurement to nearly horizontal paths because a change in path angle causes the reduction of usable force applied as a standard of measurement and affects accuracy.

The use of ordinary springs is not satisfactory because ordinary spring loading varies with deformation. In the elastic region of an ordinary spring, a given load will deflect the spring a specific amount depending on choice of spring material, cross sectional area and configuration. Doubling the deformation will require double the load, and so on, in linear fashion. When such springs are applied in thickness measurement, a different force is exerted upon each thickness of material tested. The desired constant loading per unit area is not achieved for all material thicknesses. Thus, the compressive force applied by such a spring is different for different thicknesses of felts. An error of thickness measurement is also introduced in seeking worn, hard or other abnormal felt areas responsible for non-standard paper production.

It is frequently desirable to determine compressibility as well as thickness of papermakers' felts. Compressibility is defined as change of thickness under a predetermined amount of applied loading force. An accurate measurement of the compressibility of a transporting felt as it carries a wet sheet into the press region of a papermaking machine, for instance, is especially desirable. In the press region water is pressed out of the sheet and into the felt and concurrently out of the felt, thus effecting a certain amount of drying and strenghtening of the sheet. If the felt is of such nature as to resist the lateral and downward flow of water, damage to the sheet may result. It has been found that the compressibility of the transporting felt plays a vital function in permitting the ready flow of water into, through, and out of it. If the felt becomes dense and hard, and thus relatively impermeable and incompressible, through age or wear or the acquisition of papermaking fines, the proper flow of water in the nip region will be restricted and an unsatisfactory quality of sheet will result. The phenomenon of fiber disruption by localized areas of low permeability is known as "crushing."

The normal wear of papermakers' felt during use results in gradual thinning of the felts and ultimately in their failure due to the formation of holes or wear streaks. Therefore, to the experienced papermaker, knowledge of the rate of wear taking place will enable him to predict the proper time to remove the felts to obtain maximum service life consistent with causing minimum interference with the production of the desired paper grades.

Knowledge of rate of wear of different felt structures is also significant to the felt design engineer in the selection of materials, weave, etc., for papermakers' felt. That is, the choice of the type and quantity of synthetic fibers which may be blended with the conventional base of wool, and the pattern of their assembly, in order that superior durability may be engineered into the structure to carry on the papermaking process for the desired economic life of the felt is aided by the knowledge of the measured field performance characteristics imparted by such components, weave, etc.

It is an object of this invention to provide apparatus for measuring the thickness of compressible materials, which apparatus applies the same compressive forces to the materials measured regardless of variations in their thickness.

It is a further object of this invention to provide a running felt caliper for measuring the thickness of papermakers' felts while they are in motion in papermaking machines, which caliper may be used at any angle from horizontal to vertical. A further feature of this aspect of the invention is the provision of a sufficiently lightweight device to enable an operator to apply the device manually to a running felt at any convenient point to determine its thickness.

It is another object of this invention to provide a method and apparatus for measuring the degree of compressibility of compressible materials which may be in motion in either horizontal or non-horizontal planes. Here again, this aspect of the invention involves the employment of a manually applicable device for making the determination in any accessible region of the running material.

It is still another object of this invention to provide apparatus for measuring the thickness and compressibility of compressible, filamentous materials which are long in relation to their cross section, including threads, ropes, yarns, tapes, filaments, cables and the like.

It is yet another object of this invention to provide a method and apparatus for determining the compressibility profile of a papermakers' felt while the felt is in operation at the speeds normally encountered in papermaking operations which device is operable in any plane from horizontal to vertical.

Other objects will be apparent to those skilled in the art from reading the present description, taken in conjunction with the drawings, in which:

FIGURE 2 is an elevational view, partially in section, taken generally along lines 2—2 of FIGURE 1;

FIGURE 3 is a detail view of one embodiment of means for translating roller separation into an indication of thickness;

FIGURE 4 is a partial elevational view showing an embodiment utilizing five constant force springs;

FIGURE 5 is a plan view of the embodiment of FIGURE 4;

Figure 1:
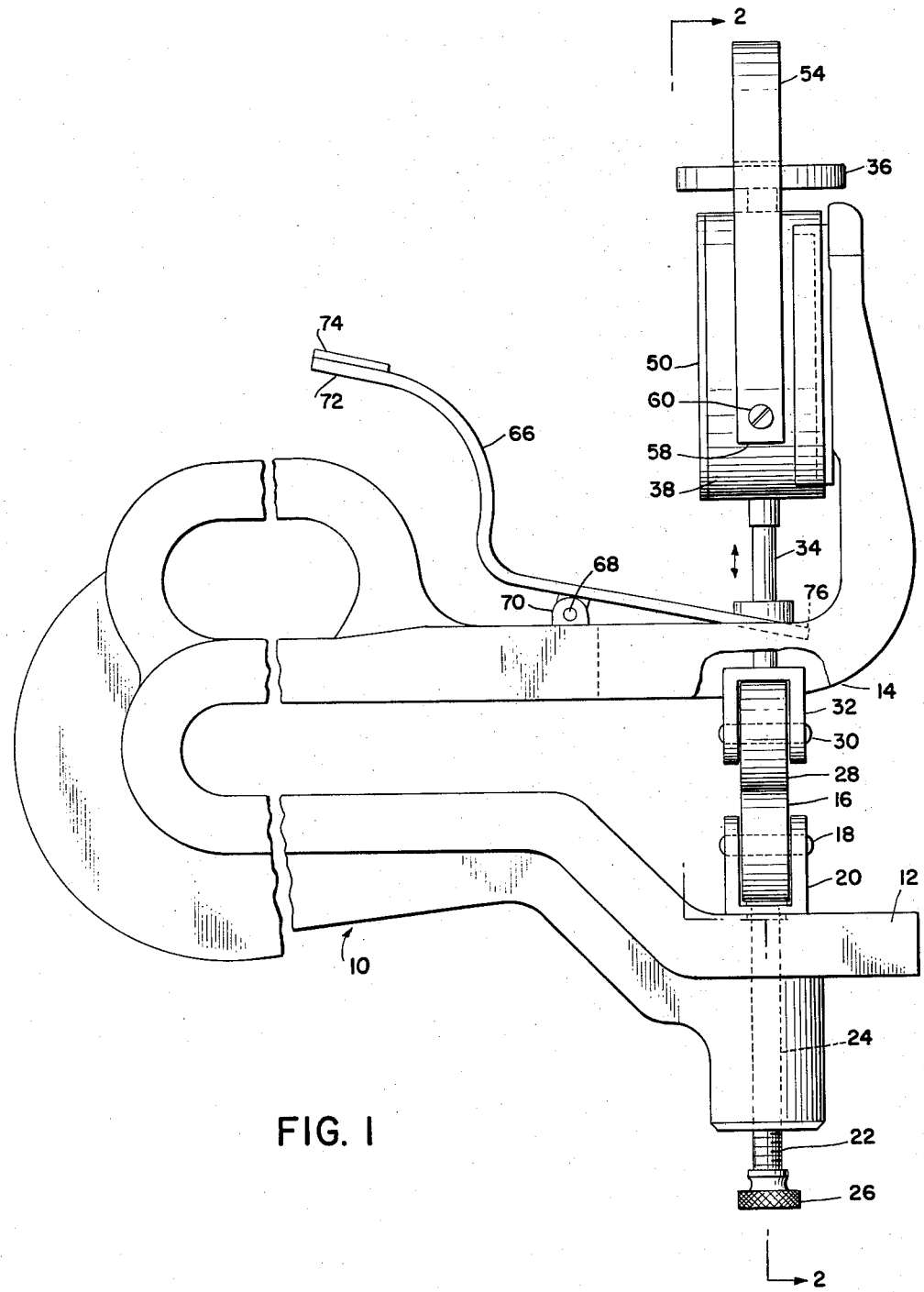
FIGURE 1 is a side elevational view of the running felt caliper of this invention when used in conjunction with a felt that is running in a horizontal plane.

The objects of this invention are accomplished, for example, by the use of a running felt caliper which is made up of a frame on which is mounted a first roller that is rotatable about a fixed axis and is so positioned with regard to the frame that it is adapted to engage one side of the material to be measured. A second roller is mounted on the frame for rotation about an axis which is adapted to move toward and away from the first roller. The second roller is then positioned to engage the surface of the material being measured opposite from that surface engaged by the first roller. One or more constant force springs are arranged to yieldably urge the second roller toward the first roller. Indicating means may be connected to the second roller so as to indicate the separation between the first and second rollers and thus measure the thickness of the material between the two rollers. A lifting lever is provided so that the rollers may be separated manually for insertion of the material to be measured.

A constant force spring is one which exerts the same force parallel to its length regardless of its extension. The devices heretofore used for measuring thickness of compressible materials have used conventional spring devices which have the characteristic of a positive gradient. That is, the greater the deflection of the conventional spring, the greater is the total force exerted by the spring. It has been found that by combining a spring device which has a zero gradient in a thickness measuring apparatus high degrees of accuracy necessary for accurate determinations of the thickness and compressibility characteristics of moving papermakers' felts are achieved. By zero gradient is meant that the total force exerted by the spring is the same regardless of the deflection of the spring.

It has been found that by utilizing a constant force spring or springs in the running felt caliper of this invention that the caliper is operable with material that is moving in any plane, whether horizontal or vertical or at any angle between horizontal and vertical. The caliper of the present invention has thus been found to overcome the deficiency of prior thickness gauges which were limited to use in a substantially horizontal plane.

It is a further feature of this invention that, because the force applied by the constant force spring is the same at any extension of the spring, the thickness of the material being measured does not introduce an error of measurement of its thickness as was the case with prior devices.

While the present invention will be described in terms of its usefulness in measuring the thickness and compressibility of papermakers' felts, it is to be understood that the invention may be used as well with any woven or knitted textile structures in either the dry or wet condition, and in general with any relatively soft, compressible, filamentous materials which are long in relation to their cross section, including without limitation, threads, ropes, yarns, tapes, filaments, cables and the like. While the preferred embodiment of this invention is for use in connection with papermakers' felts which range in thickness from about 30 to 250 thousandths of an inch, it is to be understood that thicker or thinner materials may be measured provided that the frame of the measuring device is adapted to properly support the rollers in engagement with the material. The apparatus of this invention may be used, for instance, to measure the compressibility of fiber-glass insulation which may range in thickness from 2 to 6 inches.

It is a feature of this invention that the apparatus may be used to determine thickness and compressibility while the material being measured is in motion. Particularly, the apparatus may be used to measure papermakers' felts which are in operation at conventional papermaking speeds. In papermaking operations, felts may travel up to thirty-six hundred feet per minute or faster.

In a preferred embodiment, rollers are used as material contacting members, but shoes, ski shaped members, or other contacting means appropriate to the material being measured may be substituted for the rollers.

Also in a preferred embodiment of the present invention two constant force springs are utilized. The springs are so arranged that either one or both of the springs may be adapted to urge the rollers together. This is a particular advantage that permits thickness to be observed under more than one compressive force and is utilized to obtain information on the compressibility or deformability of the material being tested.

Turning now to FIGURES 1 and 2, frame 10 is formed of lower jaw 12 and upper jaw 14. Roller 16 running on shaft 18 is mounted in lower jaw 12 by yoke 20, in which shaft 18 turns. Threaded bolt 22 connected to yoke 20 is threadably connected into channel 24 in lower jaw 12. Bolt 22 is arranged to be turned by knurled head 26.

Movable roller 28 is mounted on shaft 30 which is mounted in yoke 32. Yoke 32 is connected to one end of shaft 34. Plate 36 is mounted on the other end of shaft 34. Shaft 34 passes through indicator housing 38. As shown in FIGURES 1, 2 and 3, rack 40 on shaft 34 engages pinion 42 mounted within indicator housing 38. Pinion 42 is mounted on common shaft 44 with indicating needle 46 which is arranged to rotate with shaft 44 in front of scale card 48. Transparent cover 50 encloses the front of indicator housing 38.

Constant force springs 52, 54 are connected near their respective ends 56, 58 by fasteners 60 to indicator housing 38. The remainder of the spring engages plate 36 to yieldably urge rollers 16, 28 together. The springs 52, 54 may be placed in positions 62, 64 when disengaged from plate 36.

Lifting lever 66 is mounted by shaft 68 to boss 70. End 72 of lifting lever 66 has plate 74 for engagement by the operator's thumb. The other end 76 is forked so as to fit around shaft 34 and forms tines 78, 80. The tines 78, 80 are arranged to engage ears 82, 84 of collar 86. Collar 86 is connected to shaft 34.

In operation a compressible material may be placed between rollers 16, 28 by depressing end 72 of shaft 66, thus engaging ears 82, 84 and lifting roller 28 away from roller 16. The lifting lever may then be released and the compressible material spaces roller 28 away from roller 16. The separation of rollers 16, 28 positions shaft 34 accordingly. The position of shaft 34 locates needle 46 relative to face card 48, thus indicating the separation of rollers 16, 28. Face card 48 may be calibrated, for instance in thousandths of inches, so that the thickness of the compressible material may be read directly from the face card.

Constant force springs 52, 54 may be engaged to yieldably urge plate 36, shaft 34 and roller 28 toward roller 16, thus resisting the force tending to move rollers 16 and 28 apart. The extent of the resisting force depends on the tension of the springs 52, 54.

If desired, spring 52 may be manually removed from plate 36 and placed into disengaged position 62. Similarly, if desired, constant force spring 54 may be manually removed from plate 36 and placed in disengaged position 64. Thus, either one or both of the springs may be used to yieldably urge rollers 16 and 28 together. If desired, constant force springs 52, 54 may be of different forces; thus three different compressive forces are possible depending on whether springs 52, 54 are used singly or together.

Turning now to FIGURES 4 and 5, shaft 34, indicator housing 38, shaft 44, indicating needle 46 and plate 36 are arranged as in FIGURES 1, 2 and 3. In the embodiment of FIGURES 4 and 5, five constant force springs 86, 88, 90, 92, 94 are mounted at one end to plate 96 by fasteners 98. Plate 96 is connected by brackets 100, 102 to indicator housing 38.

In operation, 1, 2, 3, 4, or 5 of the constant force springs may be engaged with plate 36 to yieldably urge plate 36, shaft 34 and roller 28 toward roller 16. Any one or all of the springs may be disengaged to vary the force applied to plate 36. When the constant force springs 86, 88, 90, 92, 94 are disengaged they may be placed in a rest position on plate 96.

The adjustment of the gauge to zero condition is made with no material between the rollers. The zero adjustment may be accomplished either by a screw mechanism, such as bolt 22 located in lower jaw 12 of the frame 10 as shown in FIGURES 1 and 2, or by suitable zero elements on the gauge bezel.

Figure 6:
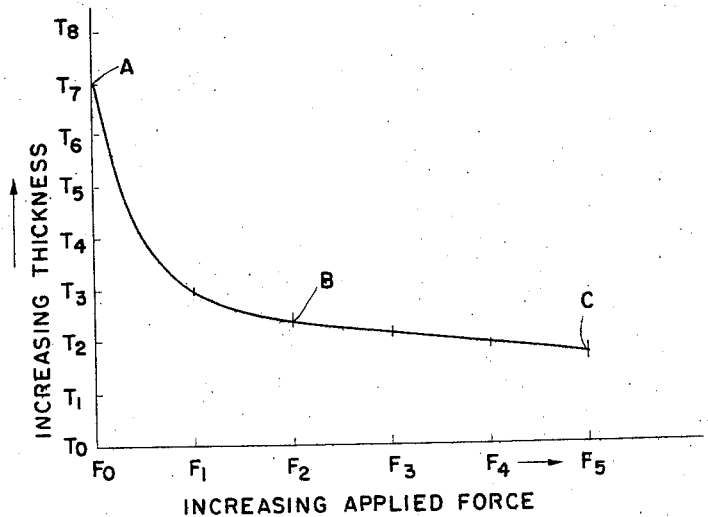
FIGURE 6 is a typical graph of compressible material thickness under increasing applied force.

Compressibility of a material may be determined by the preparation of a load-deformation curve as shown in FIGURE 6 utilizing the running felt caliper of this invention. In the preferred embodiment that utilizes two constant force springs, the load-deformation curve is prepared by measuring the thickness of the material under three compressibility force loadings. The first point, "A" in FIGURE 6, may be obtained by a special procedure with one spring engaged and provides information as to thickness with no force applied. To obtain this thickness measurement the caliper is positioned with the rollers apart and with the fixed roller 16 just touching one side of the felt. The position is indicated by the start of rotation of the roller. Movable roller 28 is then lowered toward the face of the deformable material by manually controlling spring resisting force through thumb pressure on lifting lever 66 thereby lowering roller 28 to just graze the surface of the moving material. First indication of contact is signaled by rotation of previously stopped roller 28. Measurement of maximum thickness with no force applied is read from needle 46 position over card 48. The thickness under these conditions is recorded.

The second point, "B" in FIGURE 6, on the load-deformation curve may be obtained by fully engaging one of the constant force springs and measuring thickness. The third point, "C" in FIGURE 6, may be obtained by engaging both of the constant force springs and measuring the thickness. With the three points thus obtained a load-deformation curve may be drawn and inferences as to compressibility of the material measured may be drawn therefrom.

It is to be understood that one or more constant force springs may be employed in the caliper of this invention. For instance, as shown in FIGURES 4 and 5, five constant force springs may be used. A load-deformation curve of a compressible material may be prepared using the embodiment of FIGURES 4 and 5 by measuring the felt thickness with, successively, one, two, three, four and five of the springs engaged.

Thus, a load-deformation curve having six points is obtainable. As shown in FIGURE 6 a reading may be obtained at each of values $F_0$, $F_1$, $F_2$, $F_3$, $F_4$, and $F_5$. It is not to be implied that all members of the array of constant force springs have the same force values. Thus by combinations of different force value springs, more points than the number of springs could be obtained to define significant portions of the deformation curve. The more points obtainable for the load-deformation curve the greater the accuracy of the inferences that may be drawn as to compressibility. The materials to which this invention is directed are of such nature that a straight line relation does not properly describe their load-deformation or their compressibility characteristics. The utilization of a multiple spring embodiment aids in the accuracy of determination of compressibility. Load-deformation curves are unique for each particular material being measured and may be utilized as a basis for comparisons of types of structure, materials of construction, as a means of measuring the degree of wear, etc., of a felt, as a measure of the felt's continuing suitability for use in a papermaking machine, and the like.

In a preferred embodiment of this invention the device is of moderate size and weight and is capable of being hand-held without difficulty, the frame being U-shaped or C-shaped in configuration. With such a device the edges of a felt may be traversed for a distance of six to twelve inches conveniently, and measurement of the thickness and compressibility of this region obtained which are usually typical for the entire felt.

Figure 7:
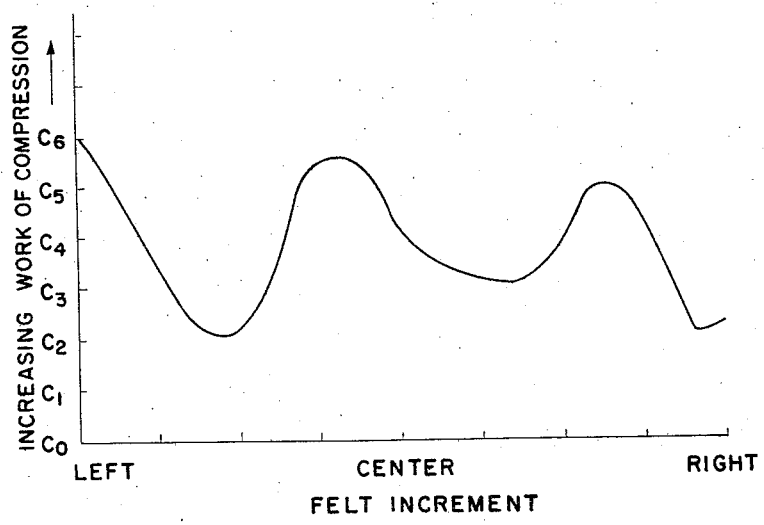
FIGURE 7 is a typical compressibility profile of a papermakers' felt.

In another embodiment for conducting a profile study of the wear or thickness of a felt across its full width, as shown in FIGURE 7, a rack or rail mounting may be utilized to provide length of traverse with stability and safety. In utilizing such an embodiment, the rollers are positioned to sequentially approach the center of the felt from one edge, readings of thickness being taken at such intervals as are deemed desirable.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

A portable running felt caliper of such weight as to be conveniently applied to the various felt runs common to papermaking machines for use in determining the thickness under a plurality of applied compressive forces of a papermakers' felt which is moving through an angular plane at operating speeds encountered in papermaking comprising first and second felt contacting means adapted to engage opposite sides of the felt, at least two constant force springs yieldably urging said first and second felt contacting means toward each other, each of said springs being arranged to be selectively rendered effective or ineffective at will, and indicating means coupled to said felt contacting means for indicating the thickness of felt between said contacting means.

References Cited by the Examiner

UNITED STATES PATENTS

| | | | |
|---|---|---|---|
| 1,892,005 | 12/1932 | Richmond | 33—147 |
| 2,200,880 | 5/1940 | Fox | 33—147 |
| 2,325,026 | 7/1943 | Anway | 73—94 |
| 2,913,899 | 11/1959 | Wohler | 73—94 |

FOREIGN PATENTS 800,421    8/1958    Great Britain.

OTHER REFERENCES

Cook, W. J. and Clark, P. C.: The Negator Spring—A Basic New Elastic Member, in Product Engineering, July 1949, pages 136–140.

Spring Motor. In Review of Scientific Instruments, vol. 25, No. 10, October 1950, pages 888–889.

Mankonen: The Neg'ator in Instrumentation, Instrument Society of America Journal, vol. 8, September 1952, pp. 115–119.

ISAAC LISANN, *Primary Examiner.*

ROBERT B. HULL, *Examiner.*